US010871665B2

(12) United States Patent
Tian et al.

(10) Patent No.: US 10,871,665 B2
(45) Date of Patent: Dec. 22, 2020

(54) TRANSFER PLATE PRETREATMENT DEVICE AND METHOD, AS WELL AS TRANSFER DEVICE AND PLATE-HANGING METHOD

(71) Applicants: BOE TECHNOLOGY GROUP CO., LTD., Beijing (CN); Hefei BOE Optoelectronics Technology Co., Ltd., Hefei, Anhui (CN)

(72) Inventors: Wei Tian, Beijing (CN); Jun Zhang, Beijing (CN); Xianfeng Zheng, Beijing (CN)

(73) Assignees: BOE TECHNOLOGY GROUP CO., LTD., Beijing (CN); HEFEI BOE OPTOELECTRONICS TECHN, Anhui (CN)

( * ) Notice: Subject to any disclaimer, the term of this patent is extended or adjusted under 35 U.S.C. 154(b) by 137 days.

(21) Appl. No.: 16/043,617

(22) Filed: Jul. 24, 2018

(65) Prior Publication Data

US 2019/0129207 A1    May 2, 2019

(30) Foreign Application Priority Data

Oct. 27, 2017    (CN) .......................... 2017 1 1025150

(51) Int. Cl.
| G02F 1/13 | (2006.01) |
| B05D 3/02 | (2006.01) |
| B29C 59/04 | (2006.01) |
| B65G 49/06 | (2006.01) |
| B05D 1/28 | (2006.01) |
| G02F 1/1337 | (2006.01) |

(52) U.S. Cl.
CPC ............. G02F 1/1303 (2013.01); B05D 1/28 (2013.01); B05D 3/0218 (2013.01); B29C 59/046 (2013.01); B65G 49/06 (2013.01); G02F 1/1337 (2013.01); G02F 2001/1316 (2013.01)

(58) Field of Classification Search
None
See application file for complete search history.

(56) References Cited

U.S. PATENT DOCUMENTS

| 5,735,204 A | 4/1998 | Hara et al. |
| 2008/0168915 A1 | 7/2008 | Chung |

(Continued)

FOREIGN PATENT DOCUMENTS

| CN | 104698686 A | 6/2015 |
| CN | 104708897 A | 6/2015 |

(Continued)

OTHER PUBLICATIONS

First Office Action dated Dec. 25, 2019, for corresponding Chinese application 201711025150.8.

*Primary Examiner* — Nathan T Leong
(74) *Attorney, Agent, or Firm* — Nath, Goldberg & Meyer; Joshua B. Goldberg

(57) ABSTRACT

The present disclosure provides a transfer plate pretreatment device and method, as well as a transfer device and a plate-hanging method. The transfer plate pretreatment device comprises: a driving roller, which comprises a heating layer configured to heat a transfer plate deployed on the driving roller; and a pressing roller, which is configured to press the transfer plate to improve wettability of the transfer plate.

11 Claims, 4 Drawing Sheets

(56) References Cited

U.S. PATENT DOCUMENTS

| | | | |
|---|---|---|---|
| 2016/0274388 A1* | 9/2016 | Wang | B41F 27/1231 |
| 2017/0217153 A1* | 8/2017 | Jing | C23C 14/22 |
| 2017/0276981 A1 | 9/2017 | Zheng et al. | |
| 2018/0043387 A1 | 2/2018 | Tian et al. | |
| 2018/0240932 A1 | 8/2018 | Chen | |

FOREIGN PATENT DOCUMENTS

| | | | |
|---|---|---|---|
| CN | 105425431 A | 3/2016 |
| CN | 105644135 A | 6/2016 |
| CN | 105669041 A | 6/2016 |
| CN | 106094350 A | 11/2016 |
| CN | 106903978 A | 6/2017 |

\* cited by examiner

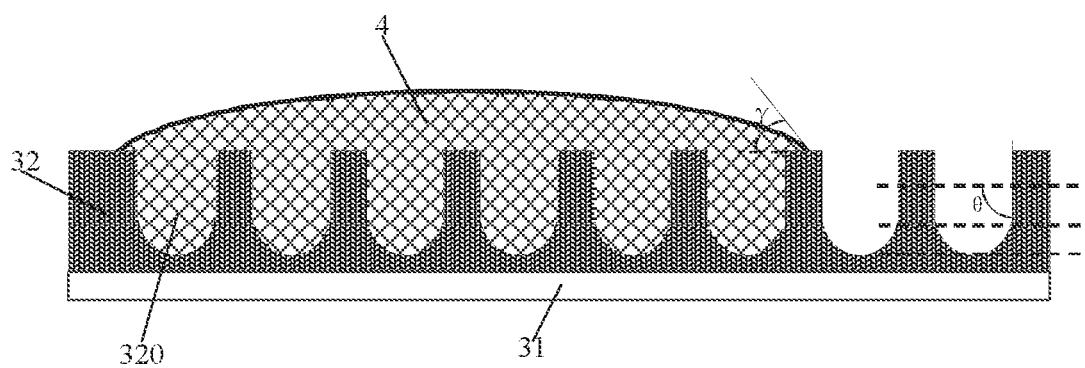
Fig. 2 (Amended)

TRANSFER PLATE PRETREATMENT DEVICE AND METHOD, AS WELL AS TRANSFER DEVICE AND PLATE-HANGING METHOD

CROSS-REFERENCE TO RELATED APPLICATION

This application claims priority of Chinese Patent Application No. 201711025150.8 filed with the Chinese Intellectual Property Office on Oct. 27, 2017, the disclosure of which is incorporated herein in its entirety by reference.

TECHNICAL FIELD

The present disclosure relates to the technical field of display technology, and particularly relates to a transfer plate pretreatment device and method, as well as a transfer device and a plate-hanging method.

BACKGROUND

With dramatic development, liquid crystal display panels have become an indispensable part of people's daily life.

In the manufacturing process of a liquid crystal display panel, it is typically required to transfer an alignment film onto a counter substrate by a transfer plate. Since the transfer plate is made of a resin material, it usually needs to be infiltrated before use. If the transfer plate is not infiltrated well before use, it will directly lead to problems such as an alignment film with a thin thickness and poor uniformity.

Current methods of improving wettability of the transfer plate usually include liquid-soaking infiltration, which is to soak the transfer plate with a chemical reagent. However, this method involves a long infiltration period and basically relies on manual operation, thus may causing harm to a human body and environment due to the use of the chemical reagent.

Therefore, how to improve wettability of the transfer plate to make it better and safer has become an urgent problem to be solved.

SUMMARY

The present disclosure has been accomplished in order to at least partially solve the problems in related art. The present disclosure provides a transfer plate pretreatment device and method, as well as a transfer device and a plate-hanging method that can effectively improve wettability of the transfer plate.

According to one aspect of the disclosure, there is provided a transfer plate pretreatment device, comprising:

a driving roller, which comprises a heating layer configured to heat a transfer plate deployed on the driving roller; and a pressing roller, which is configured to press the transfer plate to improve wettability of the transfer plate.

The transfer plate may include a first base layer and a mesh layer stacked together, the mesh layer being configured to contact a transfer liquid; and the driving roller further comprises a driving roller body, and the heating layer is wrapped on an outer surface of the driving roller body and configured to be attached to and heat the mesh layer.

A central axis of the pressing roller may be parallel to a central axis of the driving roller; and the pressing roller is movable toward the driving roller to press the transfer plate.

Two rows of first magnetic holes may be disposed on a roller surface of the driving roller, and opposite edges of one surface of the transfer plate are respectively provided with magnetic pins configured to be engaged with the first magnetic holes magnetically.

The transfer plate pretreatment device may further comprise a conveyor belt which is located below the driving roller and configured to convey the transfer plate to be pretreated onto the driving roller.

According to another aspect of the disclosure, there is provided a transfer device, comprising:

a transfer plate pretreatment device as discussed above;

a plate cylinder; and a plate-hanging assembly, which is disposed between the transfer plate pretreatment device and the plate cylinder, and configured to hang the transfer plate processed by the transfer plate pretreatment device onto the plate cylinder.

The plate-hanging assembly may include a conveying roller disposed above the driving roller of the transfer plate pretreatment device, and a plate-hanging roller disposed between the plate cylinder and the conveying roller, the conveying roller is configured to convey the transfer plate processed by the transfer plate pretreatment device onto the plate-hanging roller, and the plate-hanging roller is configured to hang the transfer plate onto the plate cylinder.

A central axis of the plate-hanging roller may be parallel to a central axis of the plate cylinder; and the plate-hanging roller is movable toward the plate cylinder to press the transfer plate while hanging so that the transfer plate is attached to the plate cylinder.

Two rows of second magnetic holes may be disposed on a surface of the plate cylinder, and opposite edges of one surface of the transfer plate are respectively provided with magnetic pins configured to be engaged with the second magnetic holes magnetically.

A suction hole may be provided on a roller surface of the plate-hanging roller, and configured to suck the transfer plate such that the transfer plate is attached to the plate-hanging roller.

The transfer device may further include a detecting assembly and a cleaning assembly which are disposed corresponding to a surface of the plate cylinder, the detecting assembly being configured to detect a foreign matter on the surface of the plate cylinder, and the cleaning assembly being configured to cleaning the foreign matter on the surface of the plate cylinder.

The detecting assembly may include a light emitting portion and a light receiving portion disposed on opposite sides of the plate cylinder, a connecting line between the light emitting portion and the light receiving portion is parallel to a central axis of the plate cylinder, the light emitting portion is configured to emit detecting light along the surface of the plate cylinder, and the light receiving portion is configured to receive the detecting light.

The cleaning assembly may include a wiping portion and a purging portion, the wiping portion includes a cleaning roller and a wiper wound on a surface of the cleaning roller, a central axis of the cleaning roller is parallel to a central axis of the plate cylinder, and the cleaning roller is movable along the surface of the plate cylinder, so as to drive the wiper to contact and move along the surface of the plate cylinder; and the purging portion includes a plurality of nozzles arranged in a direction parallel to the central axis of the plate cylinder and configured to blow toward the surface of the plate cylinder to clean a foreign matter on the surface of the plate cylinder.

According to still another aspect of the disclosure, there is provided a method of performing wettability pretreatment on a transfer plate using the above mentioned transfer plate pretreatment device, comprising:

deploying the transfer plate on the driving roller; and pressing the transfer plate by the pressing roller while heating the transfer plate by the driving roller, so as to improve wettability of the transfer plate.

The step of deploying the transfer plate on the driving roller may include:

operating the heating layer of the driving roller and maintaining a constant temperature, and when the transfer plate is conveyed to a lowermost position of the driving roller via a conveyor belt, engaging one row of a first magnetic holes on the driving roller with magnetic pins at a leading end of the transfer plate magnetically; and moving the driving roller clockwise until the other row of the first magnetic holes on the driving roller are engaged with the magnetic pins at a tail end of the transfer plate magnetically.

The step of pressing the transfer plate by the pressing roller while heating the transfer plate by the driving roller, so as to improve wettability of the transfer plate may include:

when a leading end of the transfer plate is moved to a position near the pressing roller, moving the pressing roller a distance toward the driving roller to press the transfer plate; and after a tail end of the transfer plate contacts the pressing roller, moving the pressing roller away from the driving roller to separate from the transfer plate.

According to yet another aspect of the disclosure, there is provided a method of hanging the transfer plate using the above mentioned transfer device, comprising:

performing wettability pretreatment on the transfer plate by the transfer plate pretreatment device;

detecting whether a foreign matter is present on a surface of the plate cylinder, if a foreign matter present, cleaning the surface of the plate cylinder, if no foreign matter present, performing subsequent steps; and hanging the transfer plate onto the plate cylinder.

The step of hanging the transfer plate onto the plate cylinder may include:

when the transfer plate is conveyed to a position of a plate-hanging roller, sucking a leading end of the transfer plate by a suction hole on a roller surface of the plate-hanging roller, and rotating the plate-hanging roller counterclockwise;

when the leading end of the transfer plate is moved to a position between the plate-hanging roller and the plate cylinder, engaging one row of second magnetic holes on the plate cylinder with magnetic pins at the leading end of the transfer plate magnetically;

moving the plate-hanging roller a distance toward the plate cylinder to press the transfer plate;

rotating the plate cylinder clockwise to drive the transfer plate to be deployed on the surface of the plate cylinder until the magnetic pins at a tail end of the transfer plate are engaged with the other row of the second magnetic holes on the plate cylinder; and restoring the plate-hanging roller to an initial position.

BRIEF DESCRIPTION OF DRAWINGS

FIG. 2 is a structural sectional view showing a transfer plate according to the first exemplary embodiment of the disclosure;

DETAILED DESCRIPTION

To achieve better understanding of technical solutions of the present disclosure for those skilled in the art, the transfer plate pretreatment device and method, as well as the transfer device and the plate-hanging method of the present disclosure will now be described in detail in conjunction with the accompanying drawings and specific embodiments.

The inventor found that by pressing a transfer plate not subjected to an infiltration treatment against a glass substrate, the wettability of the transfer plate is remarkably improved, and the resin material of the transfer plate mesh layer exhibits plasticity in a heated state. In view of this, the inventor provides a transfer plate pretreatment device and method, as well as a transfer device and a plate-hanging method that can effectively improve wettability of the transfer plate.

First Exemplary Embodiment

Figure 1:
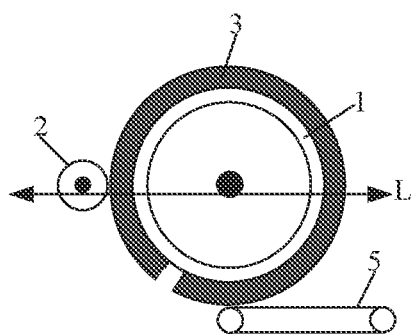
FIG. 1 is a structural side view showing a transfer plate pretreatment device according to a first exemplary embodiment of the disclosure.

This exemplary embodiment provides a transfer plate pretreatment device which, as shown in FIG. 1, includes a driving roller 1 and a pressing roller 2 disposed correspondingly. The driving roller 1 includes a heating layer configured to heat a transfer plate 3 deployed on the driving roller 1, and the pressing roller 2 is configured to press the transfer plate 3 to improve its wettability.

In an exemplary embodiment of the disclosure, the driving roller 1 and the pressing roller 2 are both cylindrical rollers. By deploying the transfer plate 3 on a cylindrical surface of the driving roller 1 and heating and pressing the transfer plate 3, a slope angle of meshes in a mesh layer of the transfer plate 3 is microscopically increased, thus macroscopically reducing a contact angle between a transfer liquid and the transfer plate 3 (e.g., to be smaller than 90°), and improving ductility of the transfer plate 3 and elasticity of the mesh layer, so that the transfer liquid can infiltrate the mesh layer of the transfer plate 3 more easily. Compared with current methods for improving wettability of the transfer plate 3, this method further improves wettability of the transfer plate 3, facilitate deploying a transfer liquid on the transfer plate 3, and finally improve the transfer effect of the transfer liquid and thickness uniformity of a film layer formed after the transfer of the transfer liquid. Meanwhile, the time required for the infiltration process of the transfer plate 3 is shortened, a utilization rate of the transfer plate pretreatment device is improved, and the infiltration effect of the transfer plate 3 is more durable.

Figure 3:
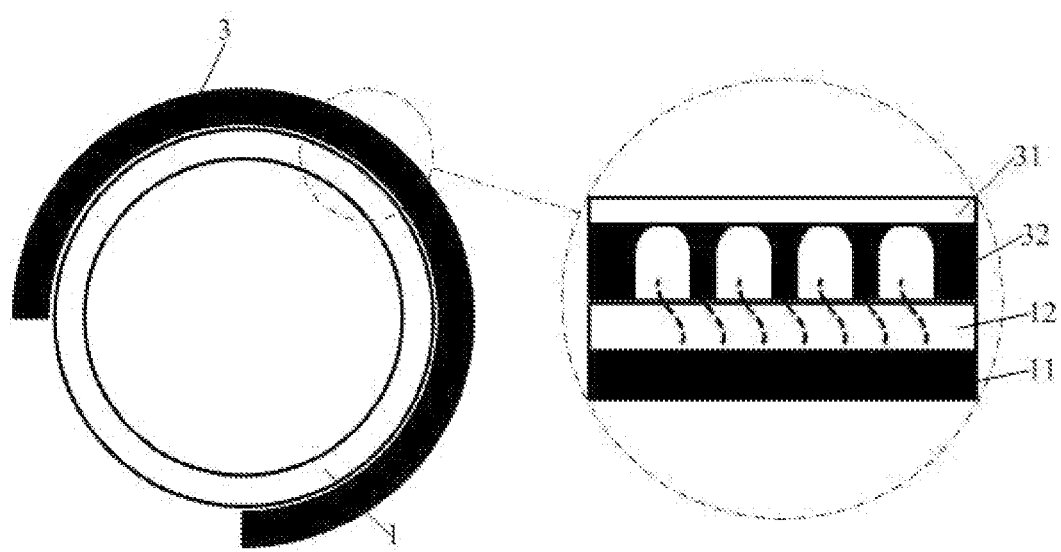
FIG. 3 is a schematic view showing a configuration in which the transfer plate is deployed on a driving roller according to the first exemplary embodiment of the disclosure.

In an exemplary embodiment of the disclosure, as shown in FIG. 2, the transfer plate 3 includes a first base layer 31 and a mesh layer 32 stacked together. The mesh layer 32 is configured to contact a transfer liquid 4. As shown in FIG. 3, the driving roller 1 further includes a driving roller body 11. The heating layer 12 is wrapped on an outer surface of the driving roller body 11 and configured to be attached to and heat the mesh layer 32. With this arrangement, the transfer plate 3 is heated by the heating layer 12 and pressed by the pressing roller 2. As a result, a slope angle θ of a mesh 320 on the mesh layer 32 is significantly increased (e.g., θ close to 90°). The increase in the slope angle θ of the mesh 320 may significantly reduce a contact angle γ between the transfer liquid 4 and a surface of the mesh layer 32 (e.g., γ<90°). At this time, the transfer liquid 4 tends to infiltrate the surface of the mesh layer 32 more easily, thereby enhancing a deploying effect of the transfer liquid 4 on the surface of the mesh layer 32, and thus improving a transfer effect of the transfer liquid 4 as well as thickness uniformity of a film layer formed after the transfer of the transfer liquid 4.

In an exemplary embodiment of the disclosure, the heating layer 12 of the driving roller 1 has a constant temperature of 85° C. The heating layer 12 and the driving roller body 11 of the driving roller 1 are both made of a material having a high thermal conductivity and a low expansion coefficient.

In an exemplary embodiment of the disclosure, as shown in FIG. 1, a central axis of the pressing roller 2 is parallel to a central axis of the driving roller 1. The central axis of the pressing roller 2 and the central axis of the driving roller 1 are arranged in a first direction L; the pressing roller 2 may be moved toward the driving roller 1 along the first direction L to press the transfer plate 3. Meanwhile, the pressing roller 2 may also be moved away from the driving roller 1 along the first direction L to release the pressing on the transfer plate 3.

It should be noted that when pressing the transfer plate 3, the pressing roller 2 causes an indentation of 25-30 μm in a surface of the first base layer 31 of the transfer plate 3. Thus, under a pressing action of the pressing roller 2, the wettability of the transfer plate 3 may be greatly improved.

Figure 4:
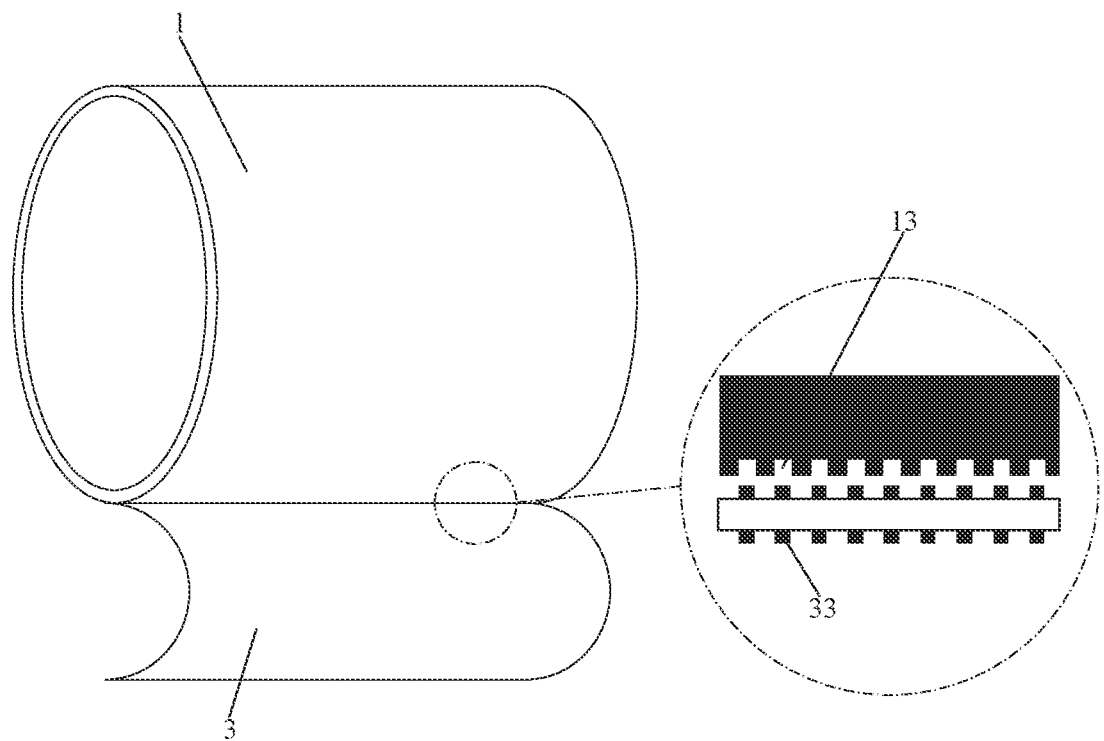
FIG. 4 is a schematic view showing a configuration in which the driving roller is engaged with the transfer plate through first magnetic holes and magnetic pins according to the first exemplary embodiment of the disclosure.

In an exemplary embodiment of the disclosure, as shown in FIG. 4, two rows of first magnetic holes 13 are disposed on a roller surface of the driving roller 1, and opposite edges of one surface of the transfer plate 3 are respectively provided with magnetic pins 33. The magnetic pins 33 are configured to be engaged with the first magnetic holes 13 magnetically.

In an exemplary embodiment of the disclosure, the two rows of first magnetic holes 13 are arranged respectively corresponding to opposite edges of a deploying area of the transfer plate 3. A row of magnetic pins 33 is respectively disposed at a leading end and a tail end of the transfer plate 3. The two rows of magnetic pins 33 may be engaged with the two rows of first magnetic holes 13 magnetically and correspondingly. The arrangement of the first magnetic holes 13 and the magnetic pins 33 enables a high-precision docking between the driving roller 1 and the transfer plate 3, while ensuring that the transfer plate 3 is securely deployed on the roller surface of the driving roller 1 during the improvement of the wettability, and thus ensuring stability in the wettability improvement of the transfer plate 3 by heating and pressing.

In an exemplary embodiment of the disclosure, the first magnetic holes 13 are engaged with the magnetic pins 33 by a magnetic force. Magnetism of the first magnetic holes 13 is controlled by an electric switch. For example, when the electric switch is turned on, the first magnetic holes 13 have magnetism and can be engaged with the magnetic pins 33 so that the driving roller 1 secures the transfer plate 3 during the improvement of the wettability; When the electric switch is turned off, the first magnetic holes 13 are no longer magnetic or engaged with the magnetic pins 33 so that the transfer plate 3 is releasable from the driving roller 1 after the improvement of wettability is completed.

In an exemplary embodiment of the disclosure, as shown in FIG. 1, the transfer plate pretreatment device further includes a conveyor belt 5, which is located below the driving roller 1 and configured to convey the transfer plate 3 to be pretreated onto the driving roller 1. The arrangement of the conveyor belt 5 enables automatic transfer and wettability improvement of the transfer plate 3, thereby avoiding adverse effects caused by manual operations on the improvement of wettability of the transfer plate 3, such as ill location and deployment of the transfer plate 3 on the driving roller 1.

Based on the above structure of the transfer plate pretreatment device, this exemplary embodiment further provides a method of performing wettability pretreatment on a transfer plate by this transfer plate pretreatment device, comprising:

Step S01: deploying the transfer plate on the driving roller; and

Step S02: pressing the transfer plate by the pressing roller while heating the transfer plate by the driving roller, so as to improve wettability of the transfer plate.

The specific process of performing wettability pretreatment on a transfer plate includes:

(1) operating the heating layer of the driving roller and maintaining a constant temperature, conveying the transfer plate from a conveyor port to the conveyor belt, and when the transfer plate is conveyed to a lowermost position of the driving roller via the conveyor belt, engaging one row of the first magnetic holes on the driving roller with the magnetic pins at a leading end of the transfer plate magnetically;

(2) moving the driving roller clockwise until the other row of the first magnetic holes on the driving roller are engaged with the magnetic pins at a tail end of the transfer plate magnetically, and when the leading end of the transfer plate is moved to a position near the pressing roller, moving the pressing roller a distance toward the driving roller to press the transfer plate;

(3) after the tail end of the transfer plate contacts the pressing roller, moving the pressing roller away from the driving roller and restoring to an initial position to separate from the transfer plate; and (4) moving the driving roller counterclockwise, when the tail end of the transfer plate reaches an uppermost position of the driving roller, the first magnetic holes at this position lose magnetism automatically; continuing moving the driving roller counterclockwise, when the leading end of the transfer plate reaches the uppermost position of the driving roller, the first magnetic holes at this position also lose magnetism automatically. At this time, the transfer plate completes its wettability strengthening process and is separated from the driving roller.

The first exemplary embodiment has the following beneficial effects: by deploying the transfer plate on a cylindrical surface of the driving roller and heating and pressing the transfer plate, the transfer plate pretreatment device provided in the first exemplary embodiment can microscopically increase a slope angle of meshes in a mesh layer of the transfer plate, thus macroscopically reducing a contact angle between a transfer liquid and the transfer plate, and improving ductility of the transfer plate and elasticity of the mesh layer, so that the transfer liquid can infiltrate the mesh layer of the transfer plate more easily. It improves wettability of the transfer plate, facilitate deploying a transfer liquid on the transfer plate, and finally improve the transfer effect of the transfer liquid and thickness uniformity of a film layer formed after transfer of the transfer liquid. Meanwhile, the time required for the infiltration process of the transfer plate is shortened, a utilization rate of the transfer plate pretreatment device is improved, and the infiltration effect of the transfer plate is more durable.

Second Exemplary Embodiment

Figure 5:
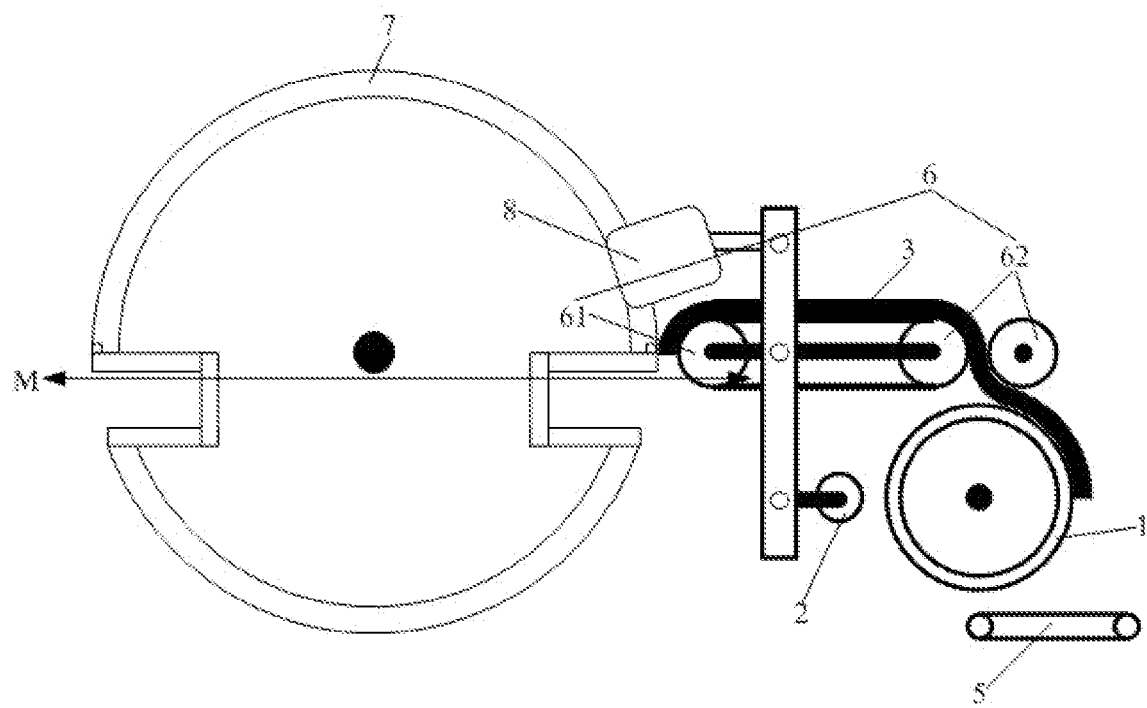
FIG. 5 is a structural side view showing a transfer device according to a second exemplary embodiment of the disclosure.

This exemplary embodiment provides a transfer device which, as shown in FIG. 5, comprises the transfer plate pretreatment device of the first exemplary embodiment, as well as a plate-hanging assembly 6 and a plate cylinder 7. The plate-hanging assembly 6 is disposed between the transfer plate pretreatment device and the plate cylinder 7, and configured to hang the transfer plate 3 pretreated by the transfer plate pretreatment device onto the plate cylinder 7.

By adopting the transfer plate pretreatment device of the first exemplary embodiment, the wettability of the transfer plate 3 is improved and increased automatically before the transfer plate 3 is hung on the plate cylinder 7 so that the transfer device can automatically improve the wettability of the transfer plate 3 before hanging the plate, thereby improving the hanging efficiency and utilization rate of the transfer device.

In an exemplary embodiment of the disclosure, the arrangement of the plate-hanging assembly 6 enables automatic hanging of the transfer device, thus avoiding disadvantages such as a poor hanging accuracy or hanging effect caused by the existing manual hanging, and further improving the transfer effect of the transfer plate 3.

In an exemplary embodiment of the disclosure, the plate-hanging assembly 6 includes a plate-hanging roller 61 and a conveying roller 62. The plate-hanging roller 61 is disposed between the plate cylinder 7 and the conveying roller 62, and the conveying roller 62 is disposed above the driving roller 1 of the transfer plate pretreatment device. The conveying roller 62 is configured to transfer the transfer plate 3 processed by the transfer plate pretreatment device onto the plate-hanging roller 61, and the plate-hanging roller 61 is configured to hang the transfer plate 3 onto the plate cylinder 7.

In an exemplary embodiment of the disclosure, a central axis of the plate-hanging roller 61 is parallel to a central axis of the plate cylinder 7. The central axis of the plat-hanging roller 61 and the central axis of the plate cylinder 7 are arranged in a second direction M. The plat-hanging roller 61 may be moved toward the plate cylinder 7 in the second direction M to press the transfer plate 3 during hanging to attach it to the plate cylinder 7. Meanwhile, the plat-hanging roller 61 may be moved away from the plate cylinder 7 in the second direction M to separate the transfer plate 3 from the plate cylinder 7 when not hanging. During hanging, the plat-hanging roller 61 may press the transfer plate 3 to attach it to the plate cylinder 7 so that a gas in a gap between the transfer plate 3 and the plate cylinder 7 is removed, and the transfer plate 3 may be hung on the plate cylinder 7 more flatly and securely. In this exemplary embodiment, the plat-hanging roller 61 is moved toward/away from the plate cylinder 7 in the second direction M via a retractable bar retractable in the second direction M.

Figure 6:
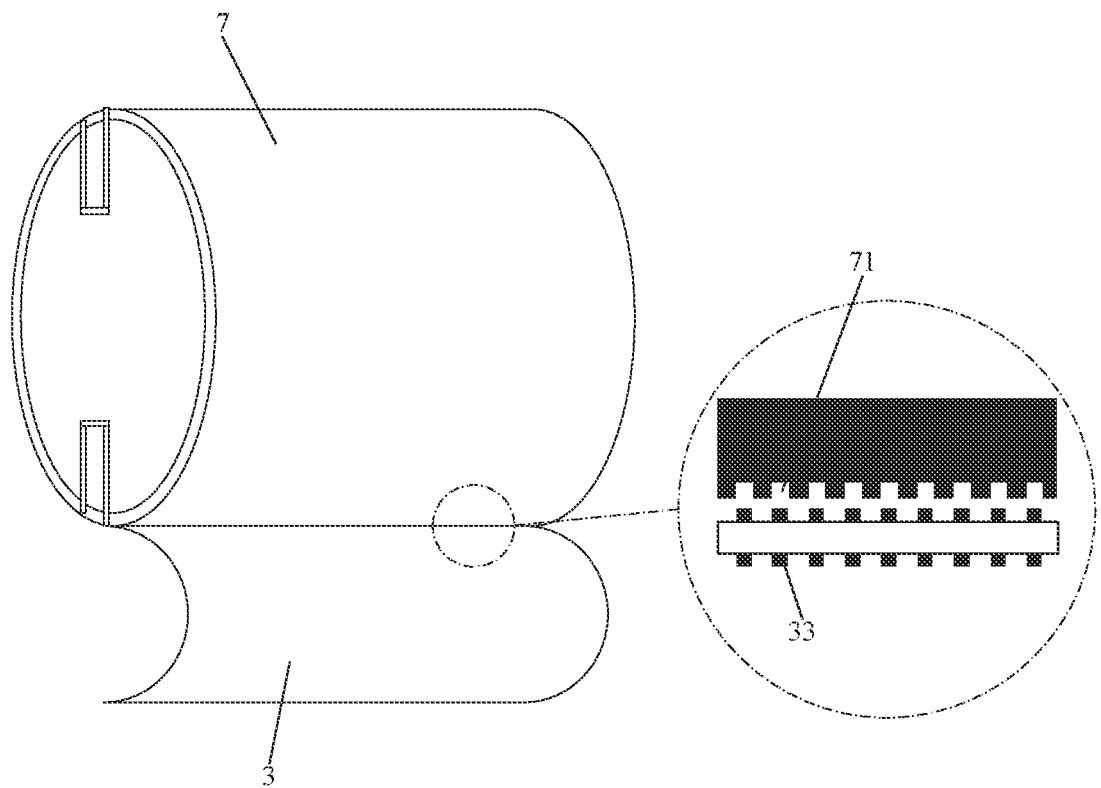
FIG. 6 is a schematic view showing a configuration in which the plate cylinder is engaged with the transfer plate through second magnetic holes and magnetic pins according to the second exemplary embodiment of the disclosure.

In an exemplary embodiment of the disclosure, as shown in FIG. 6, two rows of second magnetic holes 71 are disposed on a surface of the plate cylinder 7, and opposite edges of one surface of the transfer plate 3 are respectively provided with magnetic pins 33. The magnetic pins 33 are configured to be engaged with the second magnetic holes 71 magnetically. The two rows of second magnetic holes 71 are arranged respectively corresponding to opposite edges of a hanging area of the transfer plate 3. The two rows of magnetic pins 33 respectively disposed at a leading end and a tail end of the transfer plate 3 may be engaged with the two rows of second magnetic holes 71 magnetically and correspondingly. The arrangement of the second magnetic holes 71 and the magnetic pins 33 enables a high-precision docking between the plate cylinder 7 and the transfer plate 3, while ensuring that the transfer plate 3 can be securely hung on the plate cylinder 7 during the hanging and thus facilitating stability of the hanging.

In an exemplary embodiment of the disclosure, the second magnetic holes 71 are engaged with the magnetic pins 33 by a magnetic force. Magnetism of the second magnetic holes 71 is controlled by an electric switch. For example, when the electric switch is turned on, the second magnetic holes 71 have magnetism and can be engaged with the magnetic pins 33 so that the plate cylinder 7 can fix the transfer plate 3 during the hanging. When the electric switch is turned off, the second magnetic holes 71 are no longer magnetic or engaged with the magnetic pins 33 so that the transfer plate 3 is releasable from the plate cylinder 7 after being used.

In an exemplary embodiment of the disclosure, a suction hole is provided on the roller surface of the plate-hanging roller 61, and configured to suck the transfer plate 3 such that the transfer plate 3 is attached to the plate-hanging roller 61. The suction hole is disposed on the roller surface of the plat-hanging roller 61 at such a position that the transfer plate 3 can stably be attached to and contact the plat-hanging roller 61, thus ensuring stability of the plat-hanging roller 61.

In an exemplary embodiment of the disclosure, the suction hole on the roller surface of the plat-hanging roller 61 may suck via a negative pressure to suck the transfer plate 3. The adsorption of the transfer plate 3 can also be achieved by magnetic adsorption.

In an exemplary embodiment of the disclosure, as shown in FIG. 5, the transfer device further includes a detecting assembly and a cleaning assembly 8 which are disposed corresponding to a surface of the plate cylinder 7. The detecting assembly is configured to detect a foreign matter on the surface of the plate cylinder 7, and the cleaning assembly 8 is configured to cleaning the foreign matter on the surface of the plate cylinder 7.

Figure 7:
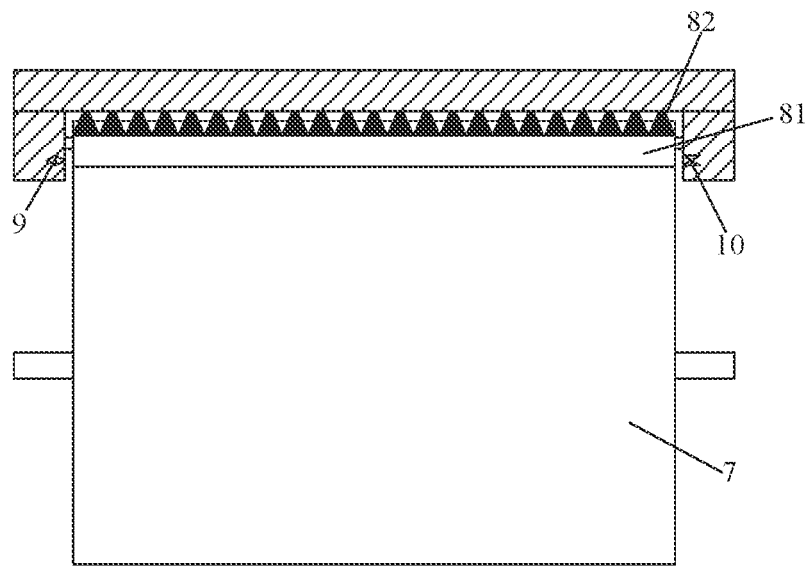
FIG. 7 is a structural schematic view showing a detecting assembly according to the second exemplary embodiment of the disclosure.

As shown in FIG. 7, the detecting assembly includes a light emitting portion 9 and a light receiving portion 10. The light emitting portion 9 and the light receiving portion 10 are disposed on opposite sides of the plate cylinder 7, and a connecting line between the light emitting portion 9 and the light receiving portion 10 is parallel to the central axis of the plate cylinder 7. The light emitting portion 9 is configured to emit detecting light along a surface of the plate cylinder 7, and the light receiving portion 10 is configured to receive the detecting light. The detecting light emitted by the light emitting portion 9 is tangent to the surface of the plate cylinder 7 or is above the surface of the plate cylinder 7 at a predetermined distance. The predetermined distance is determined according to a size of the foreign matter on the surface of the drum 7. The light receiving portion 10 may receive the detecting light when there is no foreign matter on the surface of the plate cylinder 7, and cannot receive the detecting light when there is a foreign matter on the surface of the plate cylinder 7, because the detecting light is blocked by the foreign matter on the surface of the plate cylinder 7. The arrangement of the detecting assembly realizes automatic detection of foreign matters on the surface of the plate cylinder 7, thereby facilitating improving the hanging quality and efficiency.

In an exemplary embodiment of the disclosure, the light emitting portion 9 is configured to emit infrared light, and the light receiving portion 10 is configured to receive the infrared light. Apparently, the light emitting portion 9 and the light receiving portion 10 may also implement detection of foreign matters on the surface of the plate cylinder 7 by emitting and receiving light of other types.

In addition, the detecting assembly is further provided with an alarm which alarms when the light receiving portion 10 does not receive the detecting light, so as to notify an operator that there is a foreign matter on the surface of the plate cylinder 7.

Figure 8:
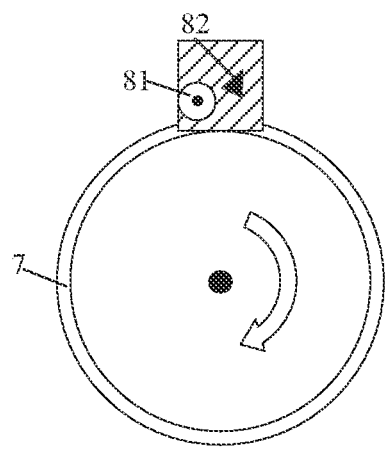
FIG. 8 is a structural side view showing a cleaning assembly according to the second exemplary embodiment of the disclosure.
Figure 9:
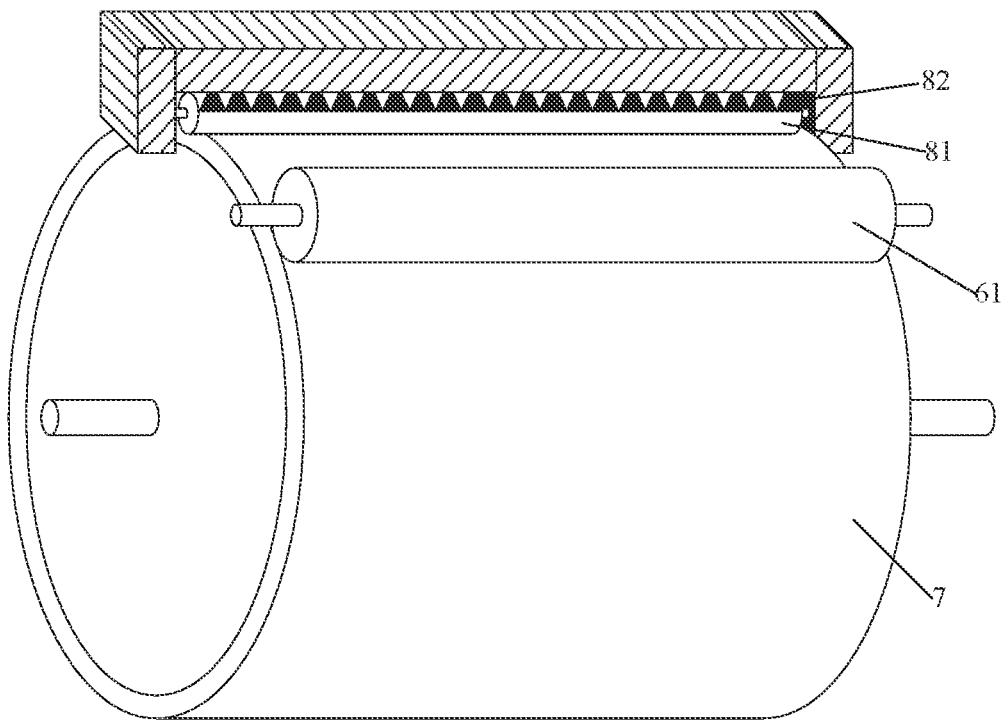
FIG. 9 is a schematic structural view showing the transfer device according to the second exemplary embodiment of the disclosure.

In an exemplary embodiment of the disclosure, as shown in FIGS. 7-9, the cleaning assembly 8 includes a wiping portion and a purging portion. The wiping portion includes a cleaning roller 81 and a wiper wound on a surface of the cleaning roller 81, a central axis of the cleaning roller 81 is parallel to the central axis of the plate cylinder 7, and the cleaning roller 81 is movable along the surface of the plate cylinder 7, so as to drive the wiper to contact and move along the surface of the plate cylinder 7. The wiper may be in contact with a surface of the plate cylinder 7 for hanging the transfer plate, so as to wipe the surface of the plate cylinder 7. The purging portion includes a plurality of nozzles 82 arranged in a direction parallel to the central axis of the plate cylinder 7 and are configured to blow toward the surface of the plate cylinder 7 to clean a foreign matter on the surface of the plate cylinder 7. The arrangement of the cleaning assembly 8 realizes automatic cleaning of foreign matters on the surface of the plate cylinder 7, thereby facilitating improving the hanging quality and efficiency.

In an exemplary embodiment of the disclosure, the nozzles 82 may blow nitrogen onto the surface of the plate cylinder 7, and clean the foreign matter on the surface of the drum 7 by blowing nitrogen onto the surface of the drum 7 at a constant rate. The wiper on the roller surface of the cleaning roller 81 is cotton or nylon, and cleans a foreign matter on the surface of the plate cylinder 7 by contacting the surface of the plate cylinder 7.

Based on the above structure of the transfer device, this exemplary embodiment further provides a plate-hanging method for the transfer device, comprising:

step S102: performing wettability pretreatment on a transfer plate with the method of performing wettability pretreatment on a transfer plate by the transfer plate pretreatment device in the first exemplary embodiment; and step S103: hanging the transfer plate onto the plate cylinder.

Before and during step S103, the process further includes:

step S101: detecting whether a foreign matter is present on the surface of the plate cylinder.

If a foreign matter present, cleaning the surface of the plate cylinder; if no foreign matter present, hanging the transfer plate onto the plate cylinder.

In that, the specific process of hanging the transfer plate onto the plate cylinder includes:

(1) when the transfer plate is conveyed to a position of the plate-hanging roller, sucking a leading end of the transfer plate by a suction hole on a roller surface of the plate-hanging roller, and rotating the plate-hanging roller counterclockwise;

(2) when the leading end of the transfer plate is moved to a leftmost position of the plate-hanging roller (a position between the plate-hanging roller and the plate cylinder), engaging one row of second magnetic holes on the plate cylinder with magnetic pins at the leading end of the transfer plate magnetically;

(3) moving the plate-hanging roller a distance toward the plate cylinder through a retractable bar to press the transfer plate;

(4) rotating the plate cylinder clockwise to drive the transfer plate to be deployed on the surface of the plate cylinder, while keeping the detecting assembly and the cleaning assembly in operation to detect and clean a foreign matter;

(5) when the plate cylinder is rotated by 180°, engaging the magnetic pins at a tail end of the transfer plate with the other row of the second magnetic holes of the plate cylinder at a current position magnetically; and (6) restoring the plat-hanging roller to an initial position via a retractable bar to complete the hanging.

The second exemplary embodiment has the following beneficial effects: by adopting the transfer plate pretreatment device of the first exemplary embodiment, the transfer device in the second exemplary embodiment may improve and increase the wettability of the transfer plate automatically before the transfer plate is hung on the plate cylinder so that the transfer device can automatically improve the wettability of the transfer plate before hanging, make the film formed by the transfer device have a more uniform thickness, improve the transfer effect and quality, and thus improve the transfer efficiency and utilization rate of the transfer device.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A transfer device, comprising:
    a transfer plate pretreatment device comprising a driving roller, which comprises a heating layer configured to heat a transfer plate deployed on the driving roller; and a pressing roller, which is configured to press the transfer plate to improve wettability of the transfer plate;
    a plate cylinder; and
    a plate-hanging assembly, which is disposed between the transfer plate pretreatment device and the plate cylinder, and configured to hang the transfer plate processed by the transfer plate pretreatment device onto the plate cylinder;

wherein the plate-hanging assembly comprises a conveying roller disposed above the driving roller of the transfer plate pretreatment device, and a plate-hanging roller disposed between the plate cylinder and the conveying roller, the conveying roller is configured to convey the transfer plate processed by the transfer plate pretreatment device onto the plate-hanging roller, and the plate-hanging roller is configured to hang the transfer plate onto the plate cylinder.

2. The transfer device according to claim 1, wherein
the transfer plate comprises a first base layer and a mesh layer stacked together, the mesh layer being configured to contact a transfer liquid; and
the driving roller further comprises a driving roller body, and the heating layer is wrapped on an outer surface of the driving roller body and configured to be attached to and heat the mesh layer.

3. The transfer device according to claim 1, wherein
a central axis of the pressing roller is parallel to a central axis of the driving roller; and
the pressing roller is movable toward the driving roller to press the transfer plate.

4. The transfer device according to claim 1, wherein two rows of first magnetic holes are disposed on a roller surface of the driving roller, and opposite edges of one surface of the transfer plate are respectively provided with magnetic pins configured to be engaged with the first magnetic holes magnetically.

5. The transfer device according to claim 4, further comprising: a conveyor belt, which is located below the driving roller and configured to convey the transfer plate to be pretreated onto the driving roller.

6. The transfer device according to claim 1, wherein
a central axis of the plate-hanging roller is parallel to a central axis of the plate cylinder; and
the plate-hanging roller is movable toward the plate cylinder to press the transfer plate while hanging so that the transfer plate is attached to the plate cylinder.

7. The transfer device according to claim 1, wherein two rows of second magnetic holes are disposed on a surface of the plate cylinder, and opposite edges of one surface of the transfer plate are respectively provided with magnetic pins configured to be engaged with the second magnetic holes magnetically.

8. The transfer device according to claim 1, wherein a suction hole is provided on a roller surface of the plate-hanging roller, and configured to suck the transfer plate such that the transfer plate is attached to the plate-hanging roller.

9. The transfer device according to claim 1, further comprising: a detecting assembly and a cleaning assembly which are disposed corresponding to a surface of the plate cylinder, the detecting assembly being configured to detect a foreign matter on the surface of the plate cylinder, and the cleaning assembly being configured to clean the foreign matter on the surface of the plate cylinder.

10. The transfer device according to claim 9, wherein the detecting assembly comprises a light emitting portion and a light receiving portion disposed on opposite sides of the plate cylinder, a connecting line between the light emitting portion and the light receiving portion is parallel to a central axis of the plate cylinder, the light emitting portion is configured to emit detecting light along the surface of the plate cylinder, and the light receiving portion is configured to receive the detecting light.

11. The transfer device according to claim 9, wherein
the cleaning assembly comprises a wiping portion and a purging portion,
the wiping portion comprises a cleaning roller and a wiper wound on a surface of the cleaning roller, a central axis of the cleaning roller is parallel to a central axis of the plate cylinder, and the cleaning roller is movable along the surface of the plate cylinder, so as to drive the wiper to contact and move along the surface of the plate cylinder; and
the purging portion comprises a plurality of nozzles arranged in a direction parallel to the central axis of the plate cylinder and configured to blow toward the surface of the plate cylinder to clean a foreign matter on the surface of the plate cylinder.

\* \* \* \* \*